(12) United States Patent
Cansever et al.

(10) Patent No.: US 9,649,942 B2
(45) Date of Patent: May 16, 2017

(54) VEHICLE COMPRISING AN ELECTRICAL DRIVE MACHINE

(71) Applicant: Bayerische Motoren Werke Aktiengesellschaft, Munich (DE)

(72) Inventors: Uemit Cansever, Munich (DE); Igor Gusyev, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/848,886

(22) Filed: Sep. 9, 2015

(65) Prior Publication Data

US 2015/0375625 A1 Dec. 31, 2015

Related U.S. Application Data

(63) Continuation of application No. PCT/EP2014/054777, filed on Mar. 12, 2014.

(30) Foreign Application Priority Data

Mar. 12, 2013 (DE) ......................... 10 2013 204 239

(51) Int. Cl.
*H02P 17/00* (2006.01)
*B60L 11/18* (2006.01)
(Continued)

(52) U.S. Cl.
CPC ........... *B60L 11/1803* (2013.01); *B60L 11/12* (2013.01); *B60L 15/02* (2013.01); *B60L 15/2009* (2013.01); *B60L 15/2045* (2013.01); *B60L 15/2054* (2013.01); *B60L 15/2072* (2013.01); *B60L 2220/14* (2013.01); *B60L 2240/429* (2013.01); *B60L 2240/486* (2013.01);
(Continued)

(58) Field of Classification Search
None
See application file for complete search history.

(56) References Cited

U.S. PATENT DOCUMENTS 5,446,351 A 8/1995 Kusano et al.
7,798,267 B2 9/2010 Winkler
(Continued)

FOREIGN PATENT DOCUMENTS

DE 693 08 688 T2 6/1997
DE 10 2004 051 530 A1 5/2006
(Continued)

OTHER PUBLICATIONS

International Search Report dated Sep. 12, 2014 (Three (3) pages).
(Continued)

*Primary Examiner* — Dirk Wright
(74) *Attorney, Agent, or Firm* — Crowell & Moring LLP

(57) ABSTRACT

An electrical drive machine for a vehicle includes a brake apparatus and a gear-selection apparatus, such that the electrical machine is designed as a current-powered synchronous machine. The vehicle includes a control unit which is associated with the current-powered synchronous machine, wherein the control unit sets a field current of the rotor based on a gear-selection position set at the gear-selection apparatus and based on a position of a brake pedal of the brake apparatus.

9 Claims, 2 Drawing Sheets

(51) Int. Cl.
*B60L 11/12* (2006.01)
*B60L 15/02* (2006.01)
*B60L 15/20* (2006.01)

(52) U.S. Cl.
CPC ....... *B60L 2250/24* (2013.01); *B60L 2250/28* (2013.01); *B60L 2260/22* (2013.01); *H02P 2207/05* (2013.01); *H02P 2207/07* (2013.01); *Y02T 10/644* (2013.01); *Y02T 10/645* (2013.01); *Y02T 10/7005* (2013.01); *Y02T 10/7077* (2013.01); *Y02T 10/72* (2013.01); *Y02T 10/7283* (2013.01)

(56) References Cited

U.S. PATENT DOCUMENTS

| | | | | |
|---|---|---|---|---|
| 2014/0070738 | A1* | 3/2014 | Luedtke | H02P 23/009 318/400.02 |
| 2014/0070739 | A1* | 3/2014 | Luedtke | B60L 11/08 318/400.02 |

FOREIGN PATENT DOCUMENTS

| | | |
|---|---|---|
| DE | 10 2011 078 958 A1 | 1/2013 |
| EP | 0 096 468 A2 | 12/1983 |
| EP | 1 955 916 A2 | 8/2008 |
| GB | 1 307 088 | 2/1973 |
| JP | 7-75209 A | 3/1995 |

OTHER PUBLICATIONS

German Search Report dated Nov. 27, 2013, with Statement of Relevancy (Six (6) pages).

\* cited by examiner

VEHICLE COMPRISING AN ELECTRICAL DRIVE MACHINE

CROSS REFERENCE TO RELATED APPLICATIONS

This application is a continuation of PCT International Application No. PCT/EP2014/054777, filed Mar. 12, 2014, which claims priority under 35 U.S.C. §119 from German Patent Application No. 10 2013 204 239.6, filed Mar. 12, 2013, the entire disclosures of which are herein expressly incorporated by reference.

BACKGROUND AND SUMMARY OF THE INVENTION

The invention relates to a vehicle having an electrical drive machine, comprising a braking device and a gear selecting device.

Hybrid and electric vehicles have an electrical driving machine. Frequently, permanently excited synchronous machines are used for this purpose. In the case of permanently excited synchronous machines, permanent magnets are used for the rotor, which permanent magnets generate a magnetic field without an external excitation, which magnetic field generates a torque on the rotor axis in an interaction with a 3-phase excitation of the stator. This torque can be collected from the rotor axis for the purpose of the traction of the vehicle. The traction of the vehicle can be controlled by way of a braking device, a gear selecting device and an accelerator pedal of the vehicle. This is illustrated, for example, in European Patent Document EP 0 096 468 A2.

It is an object of the invention to describe an improved vehicle having an electrical drive machine, comprising a braking device and a gear selecting device.

According to the invention, the electrical machine is designed as a current-excited synchronous machine. The vehicle has a control unit which is assigned to the current-excited synchronous machine. The control unit sets an exciting current of the rotor. The setting of the exciting current takes place as a function of a gear selecting position set at the gear selecting device, and the setting of the exciting current takes place takes place as a function of a position of the brake pedal of the braking device.

This means that the setting of the exciting current of the current-excited synchronous machine is a function of the setting at the gear selecting device as well as of the position of the brake pedal.

According to a preferred embodiment, it is particularly advantageous for the gear selecting device to have a first adjustable gear selecting position for parking the vehicle, for the gear selecting device to have a second adjustable gear selecting position for a frictional uncoupling of the wheels of the vehicle, for the gear selecting device to have a third adjustable gear selecting position for a driving operation of the vehicle when traveling forward, for the gear selecting device to have a fourth adjustable gear selecting position for a driving operation of the vehicle when traveling backward, and information can be transmitted to the control unit by way of the set gear selecting position.

In the following, the first adjustable gear selecting position will also be called "Parking"; the second adjustable gear selecting position will also be called "Neutral"; the third adjustable gear selecting position will be called "Drive"; and the fourth adjustable gear selecting position will be called "Reverse".

The gear selecting device therefore makes it possible for a user of the vehicle to select a driving mode whose function can be compared with the function of a transmission in the case of a conventional vehicle.

According to a further variant of the invention, the vehicle comprises a measuring device which determines a relative position of the brake pedal with respect to a predefined brake pedal travel, which brake pedal travel is defined by a minimal brake pedal value and by a maximal brake pedal value. The determined relative position of the brake pedal can be transmitted to the control unit.

It is particularly advantageous for the control unit to switch off the exciting current in the "Parking" gear selecting position and in the "Neutral" gear selecting position.

This means that the rotor magnetic field is de-energized in the "Parking" gear selecting position and in the "Neutral" gear selecting position. In these gear selecting positions, a traction of the vehicle, i.e. a driving operation, is not intended. The current-excitation of the rotor may therefore be deactivated.

In addition, special advantages are obtained when, in the "Drive" gear selecting position and at a brake pedal value between the maximal brake pedal value and a first critical brake pedal value, the control unit switches off the exciting current, and, in the "Reverse" gear selecting position and at a brake pedal value between the maximal brake pedal value and the first critical brake pedal value, the control unit switches off the exciting current.

In this manner, it is ensured that the exciting current is switched off according to the demand. If the brake pedal value exceeds the first critical value on the way of the maximal brake pedal value, the exciting current of the synchronous machine will be switched off.

In a further variant of the invention, in the "Drive" gear selecting position and at a brake pedal value between the minimal brake pedal value and a second critical brake pedal value, the control unit will set the exciting current. The control unit further sets the exciting current in the "Reverse" gear selecting position and at a brake pedal value between the minimal brake pedal value and the second critical brake pedal value.

If the brake pedal value exceeds a second critical value in the direction of the minimal brake pedal value, the exciting current of the synchronous machine will be set. It is thereby ensured that the exciting circuit of the synchronous machine is activated in the case of a low braking power or braking force and a traction toque can be demanded from the synchronous machine at any time.

The invention is based on the following considerations:

For reasons of energy and power efficiency, permanently excited synchronous machines are widely applied in electric and hybrid vehicles. In this type of machine, the rotor is permanently excited because permanent magnets are used for generating magnetic fields.

As an alternative, current-excited synchronous machines can be used which have no magnetic materials in the rotor. Instead, an exciting magnetic field is electromagnetically generated by copper windings. The current generating this magnetic field can be strategically controlled with respect to the operation; i.e. in contrast to a permanently excited machine, this exciting current forms an additional degree of freedom during the operation of the machine.

This means that the torque generated at the electrical machine is not only a function of a torque-forming current and a field-forming current but also of the exciting current.

Normally, exciting windings have a high inductivity and a low ohmic resistance. This results in a high time constant, which is proportional to the inductivity and indirectly proportional to the ohmic resistance. It is therefore a challenging task to provide operating strategies for a torque demand with very high time-related dynamics.

By means of the following embodiment of the invention, an operating strategy is described which permits a dynamic torque demand to a current-excited synchronous machine in a hybrid or electric vehicle and compensates the relatively sluggish dynamics of the exciting magnetic field.

Other objects, advantages and novel features of the present invention will become apparent from the following detailed description of one or more preferred embodiments when considered in conjunction with the accompanying drawings.

DETAILED DESCRIPTION OF THE DRAWINGS

The invention is based on a hybrid or electric vehicle 10 which has a gear selecting device 20 with several adjustable gear selecting positions. The latter comprises at least four gear selecting positions, such as "Drive", "Reverse", "Neutral" and "Parking". "Drive" indicates a mode in which the vehicle 10 is ready to be driven, and "Reverse" indicates the readiness to be driven in the reverse gear. The "Parking" gear selecting position is chosen when the vehicle 10 is parked without being in an operating or readiness mode. In the "Neutral" gear selecting position, the vehicle 10 is operative but there is no frictional connection with the wheels because the transmission of the vehicle is in a mechanical free-wheeling state.

A current-excited synchronous machine 30 can provide torque for the purpose of the vehicle traction. The torque demand to the synchronous machine is essentially made by the driver by operating two pedals, i.e. the brake pedal 30 and the accelerator pedal (not shown).

Figure 1:
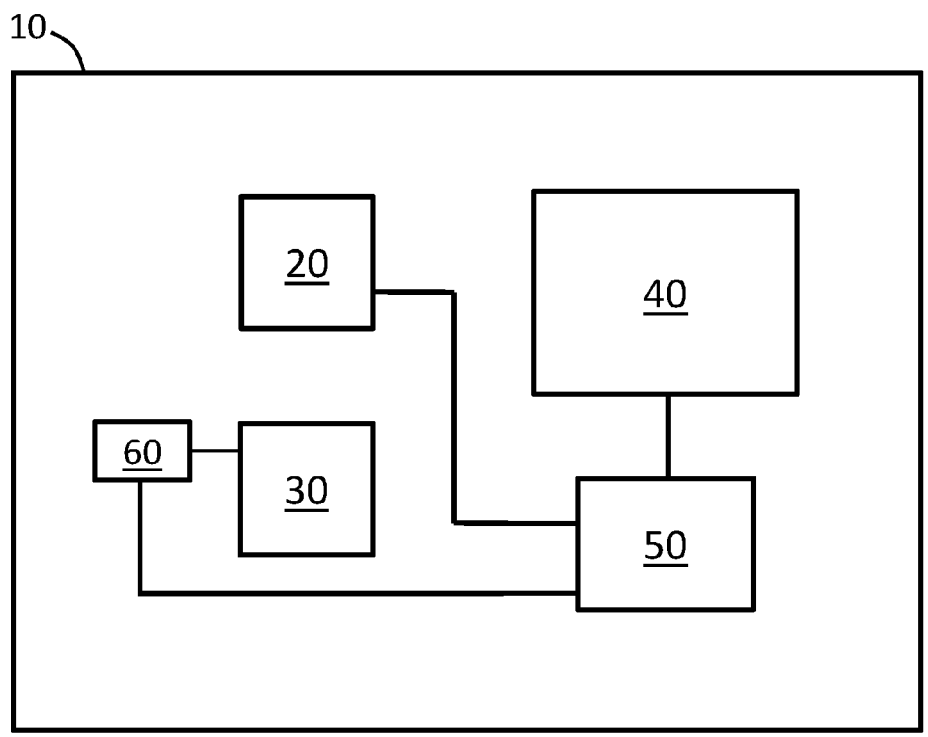
FIG. 1 illustrates a simplified diagram of a vehicle arrangement consistent with the principles of the invention.
Figure 2:
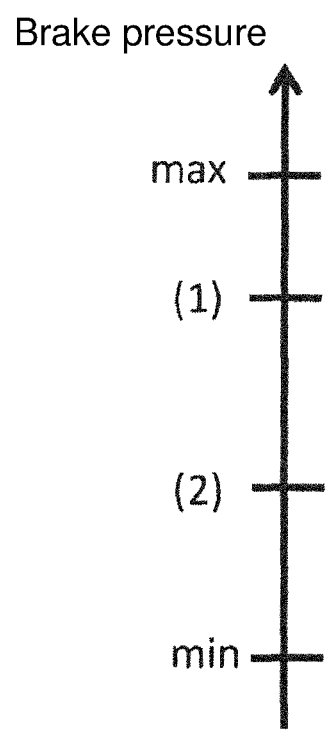
FIG. 2 illustrates a brake-pressure-dependent setting of an exciting current of a rotor of current-excited synchronous machine; and Further details, preferred embodiments and further developments are obtained from the above.

According to FIG. 1, the operating strategy for exciting a rotor of the current-excited synchronous machine 40 provides that the setting of the exciting current at a certain point in time is essentially a function of the set gear selecting position of the gear selecting device 20 and of the brake pedal position of the brake pedal 30. The setting of the exciting current takes place by a control unit 50 assigned to the synchronous machine 40.

When setting the "Parking" gear selecting position and when setting the "Neutral" gear selecting position, the control unit 50 switches off the exciting current in order to magnetically de-energize the rotor.

When setting the "Drive" gear selecting position and when setting the "Reverse" gear selecting position, the setting of the exciting current depends on the brake pedal position. The brake pedal position is determined by an appropriate measuring device 60, for example, a brake pedal sensor, which is suitable for determining a brake pedal angle. FIG. 1 indicates the brake pressure value as an example, which value correlates to the brake pedal position such that, when a brake pedal is not operated, the brake pressure is minimal (min) and, when a brake pedal is completely depressed, the brake pressure is maximal (max).

When, as an alternative or in addition, in a driving situation in which the brake pedal 30 is not operated, the latter is operated, so that the brake pressure exceeds a first critical brake pressure (1) in the direction of the maximal brake pressure, the control unit 50 will switch off the exciting current of the rotor.

When the brake pressure drops in the direction of a minimal brake pressure and falls below a second critical brake pressure (2), the control unit 50 will set the exciting current. This ensures that, as the brake pressure decreases, the exciting field of the rotor is built up, if, in the case of a further decreasing brake pressure and a possibly following torque demand by the accelerator pedal, the time period between the falling below the second critical brake pressure and the occurrence of the torque demand is utilized for building up the exciting field. When the torque demand occurs, the exciting field will therefore already largely be formed, which permits an immediate torque output. As a result, a decisive contribution is made to increasing the longitudinal dynamics of a vehicle with a current-excited synchronous machine.

If no torque demand now takes place by way of the accelerator pedal and an increase of the brake pressure occurs instead, as an alternative or in addition, the exciting current will be switched off according to the above-mentioned implementation when the first critical brake pressure is exceeded.

This setting of the exciting current as a function of the brake pedal 30 is suitable for compensating the inertia during the build-up of the exciting field and for dynamically implementing a torque demand to the machine in comparison to an exciting current setting that is dependent on the accelerator pedal position. For example, in the case of a current-excited synchronous machine with an inductivity of 0.4 Henry and a resistance of 1.5 ohm, the build-up of the exciting field to 95% of the maximal value takes a time period of 800 milliseconds, which is called a latency time here. The operating strategy according to FIG. 1 ensures that the latency time is at least partially within braking phases, i.e. when no torque is demanded.

In the direction of increasing brake pressure, the first critical brake pedal pressure assumes at least the value of the second critical brake pedal pressure; i.e., as an alternative or in addition, the two values of the first critical brake pedal pressure and of the second critical brake pedal pressure may coincide. When the values of the two critical brake pedal pressures no longer coincide, a debouncing of the setting of the exciting current will be achieved.

The operating strategy according to FIG. 1 guarantees a dynamic and efficient operation of the current-excited synchronous machine.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A vehicle comprising:
   a current-exciting synchronous electrical drive machine that provides vehicle driving torque,
   a braking device,
   a gear selecting device, and a control unit assigned to the current-excited synchronous electrical drive machine and configured to: set an exciting current of a rotor of the current-excited electrical drive synchronous electrical drive machine, and to switch off the exciting current, based on a gear selecting position set at the gear selecting device and a position of a brake pedal of the braking device.

2. The vehicle according to claim 1, wherein the gear selecting device comprises:
a first adjustable gear selecting position for parking the vehicle,
a second adjustable gear selecting position for frictional uncoupling of the wheels of the vehicle,
a third adjustable gear selecting position for a driving operation of the vehicle when traveling forward,
a fourth adjustable gear selecting position for a driving operation of the vehicle when reversing,
wherein information concerning the set gear selecting position can be transmitted to the control unit.

3. The vehicle according to claim 2, wherein the vehicle further comprises a measuring device configured to:
determine a relative position of the brake pedal with respect to a predefined brake pedal travel, which is defined by a minimal brake pedal value and by a maximal brake pedal value, and
transmit the determined relative position of the brake pedal to the control unit.

4. The vehicle according to claim 3, wherein the control unit is configured to switch off the exciting current in the first gear selecting position and in the second gear selecting position.

5. The vehicle according to claim 3, wherein
in the third gear selecting position and at a brake pedal value between the maximal brake pedal value and a first critical brake pedal value, the control unit is configured to switch off the exciting current, and
in the fourth gear selecting position and at a brake pedal value between the maximal brake pedal value and the first critical brake pedal value, the control unit is configured to switch off the exciting current.

6. The vehicle according to claim 4, wherein
in the third gear selecting position and at a brake pedal value between the maximal brake pedal value and a first critical brake pedal value, the control unit is configured to switch off the exciting current, and
in the fourth gear selecting position and at a brake pedal value between the maximal brake pedal value and the first critical brake pedal value, the control unit is configured to switch off the exciting current.

7. The vehicle according to claim 3, wherein
in the third gear selecting position and at a brake pedal value between the minimal brake pedal value and a second critical brake pedal value, the control unit is configured to set the exciting current, and
in the fourth gear selecting position and at a brake pedal value between the minimal brake pedal value and the second critical brake pedal value, the control unit is configured to set the exciting current.

8. The vehicle according to claim 4, wherein
in the third gear selecting position and at a brake pedal value between the minimal brake pedal value and a second critical brake pedal value, the control unit is configured to set the exciting current, and
in the fourth gear selecting position and at a brake pedal value between the minimal brake pedal value and the second critical brake pedal value, the control unit is configured to set the exciting current.

9. The vehicle according to claim 5, wherein
in the third gear selecting position and at a brake pedal value between the minimal brake pedal value and a second critical brake pedal value, the control unit is configured to set the exciting current, and
in the fourth gear selecting position and at a brake pedal value between the minimal brake pedal value and the second critical brake pedal value, the control unit is configured to set the exciting current.

* * * * *